UNITED STATES PATENT OFFICE.

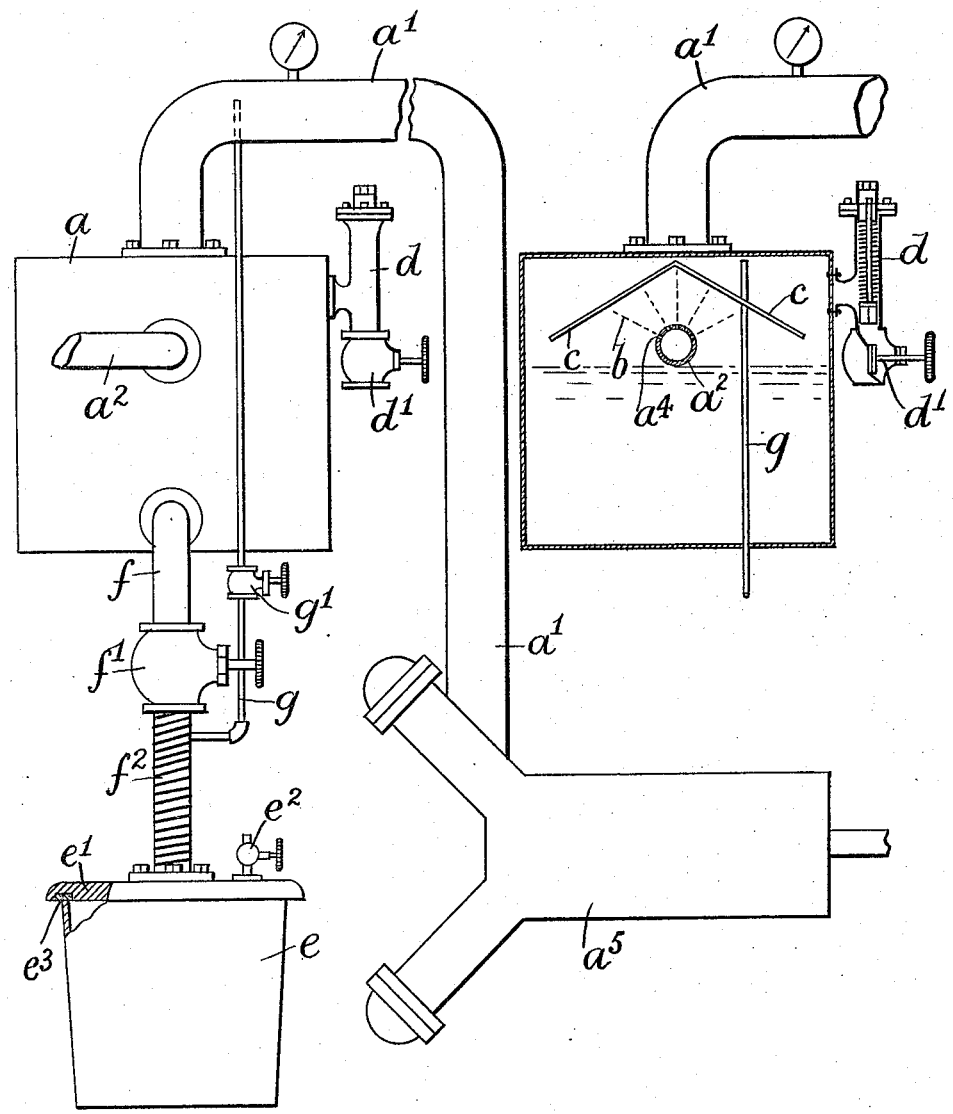

PAUL BUCK, OF LONDON, ENGLAND.

APPARATUS FOR PRODUCING ICE IN MOLDS.

1,191,559.  Specification of Letters Patent.  Patented July 18, 1916.

Application filed March 25, 1916. Serial No. 86,648.

*To all whom it may concern:*

Be it known that I, PAUL BUCK, a subject of the King of Great Britain, residing at London, England, have invented certain new and useful Improvements in Apparatus for Producing Ice in Molds, of which the following is a specification.

The invention relates to apparatus for carrying into effect that process of producing ice in molds, in which the water is submitted to a preliminary vacuum for withdrawing the air. In said known process it has been proposed to agitate the water in a vacuum chamber.

The object of the present invention is to produce apparatus which is less costly and occupies less space than apparatuses generally employed for producing clear ice.

According to the present invention the water is sprayed into a vacuum chamber, and the air is withdrawn from the water during the spraying operation, and before admitting the water into the water container which subsequently becomes the ice mold. The container is subjected to a partial vacuum by connecting it with the said vacuum chamber, and the water is then admitted to the container practically free from air, with the result that the ice is clear.

The invention is illustrated in the accompanying drawings, in which—

Figure 1 is a side elevation of a vacuum tank, water container or ice mold, and parts connected therewith, and Fig. 2 is a vertical section through the vacuum tank.

It will be understood that the invention is not limited to the particular apparatus shown and described, as it is obvious that the same may be somewhat varied.

The apparatus shown in the drawings consists of a vacuum tank $a$, which is connected at its top, by means of the pipe $a'$, with means for producing a vacuum, shown diagrammatically at $a^5$. The tank $a$ has a water inlet $a^2$, which is continued into the tank $a$, and is provided with perforations $a^4$, as seen in Fig. 2, and admits the water in the form of fine jets or spray $b$. The water is preferably directed against a baffle plate or plates $c$, which may be conveniently arranged between the end of the water inlet pipe $a^2$ and the suction pipe $a'$, thereby preventing any of the water being withdrawn by the outgoing air. The vacuum tank $a$ is also provided with an atmospheric valve $d$, which will open on a predetermined low pressure being obtained in the vacuum tank $a$, but this atmospheric valve $d$ is cut off by the screw-down valve $d'$ during the process of withdrawing the air from the water, and is only subsequently used to prevent the water containers or ice molds $e$ collapsing. The vacuum tank $a$ is connected at its lower part with the container or ice mold $e$, by means of a pipe $f$, provided with a shut-off valve $f'$, and the lower part $f^2$ of this pipe is flexible below the said valve $f'$, and is preferably armored to withstand the air pressure. The lower part of the pipe, marked $f^2$, connecting the vacuum tank $a$ to the container $e$, is provided with an equalizing pipe $g$, having a shut-off valve $g'$, which opens communication between the container $e$ and the vacuum above the tank $a$. In Fig. 1 the equalizing pipe $g$ is shown passing up into the suction pipe $a'$, whereas in Fig. 2 the pipe $g$ is shown passing to the upper part of the tank $a$, above the level to which it is filled with water.

The container $e$ is provided, in manner known, with an air-tight cover $e'$, provided with a rubber or like packing or joint $e^3$, between it and the container $e$, and this cover $e'$ is provided with an air cock $e^2$, to admit air to the container $e$ when it is desired to remove the container. The said cover $e'$ is carried by the lower part $f^2$ of the pipe connected to the vacuum tank $a$, and as this lower part of the pipe is flexible, it allows the cover $e'$ to be accurately placed on the containers $e$.

The operation of the apparatus is as follows:—Water is sprayed into the vacuum tank $a$, which is already under the influence of the vacuum pump $a^3$. The atmospheric valve $d$ is shut off, by closing the valve $d'$, to enable a high degree of vacuum to be obtained in the vacuum tank, and the valve $f'$ is also closed. When there is sufficient water in the tank $a$, a water container $e$ is placed in position beneath and in contact with the container cover $e'$. The valve $d'$ on the tank $a$ is then opened, allowing the atmospheric valve $d$ to open, thereby reducing the vacuum in the tank $a$ to such a degree that the container $e$ will not be injured by atmospheric pressure when it is opened to the tank $a$. Then the equalizing pipe $g$ is opened between the container $e$ and the vacuum at the upper part of said tank $a$, thereby causing a partial vacuum in the container $e$ and causing the cover $e'$ to seat itself tightly on the container. The water in the vacuum tank $a$ is then allowed to flow into the container $e$ by opening the valve $f'$. The water pipe $f$, $f^2$, leading into the container $e$, is then closed, and the air cock $e^2$ is opened, admitting air to the container $e$ and allowing it to be removed from its cover $e'$. The container $e$ is then submitted to any usual freezing process but, owing to the absence of air in the water, there is no necessity to agitate the water in order to produce clear ice.

What I claim as my invention is:—

1. Apparatus for producing ice in molds, having in combination a vacuum tank, means for producing a vacuum, a suction pipe connecting the vacuum apparatus with said tank, a water spraying apparatus in said tank, an atmospheric valve on said tank, a cut-off valve for shutting off the atmospheric valve, a pipe connecting the vacuum tank with a water container, a shut-off valve on said pipe, an equalizing pipe connecting that part of said pipe between the shut-off valve and the water container with the vacuum at the upper part of said tank, and a shut-off valve on the equalizing pipe, substantially as set forth.

2. Apparatus for producing ice in molds, having in combination a vacuum tank, means for producing a vacuum, a suction pipe connecting the vacuum apparatus with said tank, a perforated water inlet pipe entering the vacuum tank, a baffle plate in said tank located between the water inlet pipe and the suction pipe, an atmospheric valve on said tank, a cut-off valve for shutting the atmospheric valve, a pipe connecting the vacuum tank with a water container, a shut-off valve on said pipe, an equalizing pipe connecting that part of said pipe between the shut-off valve and the water container with the vacuum at the upper part of said tank, and a shut-off valve on the equalizing pipe, substantially as set forth.

In witness whereof I have hereunto set my hand.

PAUL BUCK.

Copies of this patent may be obtained for five cents each, by addressing the "Commissioner of Patents, Washington, D. C."